United States Patent
Greeff

(10) Patent No.: US 8,424,308 B2
(45) Date of Patent: Apr. 23, 2013

(54) CO-PRODUCTION OF SYNTHESIS GAS AND POWER

(75) Inventor: Isabella Lodewina Greeff, Linden (ZA)

(73) Assignee: Sasol Technology (Proprietary) Limited, Johannesburg (ZA)

( * ) Notice: Subject to any disclaimer, the term of this patent is extended or adjusted under 35 U.S.C. 154(b) by 113 days.

(21) Appl. No.: 12/737,810

(22) PCT Filed: Aug. 18, 2009

(86) PCT No.: PCT/IB2009/053640
§ 371 (c)(1),
(2), (4) Date: Feb. 17, 2011

(87) PCT Pub. No.: WO2010/020944
PCT Pub. Date: Feb. 25, 2010

(65) Prior Publication Data
US 2011/0131992 A1    Jun. 9, 2011

Related U.S. Application Data

(60) Provisional application No. 61/189,518, filed on Aug. 20, 2008.

(51) Int. Cl.
| | |
|---|---|
| *G21D 5/00* | (2006.01) |
| *F01K 13/00* | (2006.01) |
| *F01K 25/02* | (2006.01) |
| *F01K 25/08* | (2006.01) |
| *F01C 1/04* | (2006.01) |
| *F01G 1/00* | (2006.01) |
| *F02C 1/04* | (2006.01) |

(52) U.S. Cl.
USPC ........... 60/644.1; 60/645; 60/650; 60/651; 60/682

(58) Field of Classification Search ........... 60/644.1, 60/645–681
See application file for complete search history.

(56) References Cited

U.S. PATENT DOCUMENTS 3,951,737 A * 4/1976 Frutschi et al. ............ 376/391
4,109,701 A * 8/1978 Hilberath et al. ............ 165/64
(Continued)

FOREIGN PATENT DOCUMENTS
FR  2393052    12/1978
GB  2307277    5/1997
(Continued)

OTHER PUBLICATIONS

International Search Report for PCT/IB2009/053640 of Jun. 8, 2010.
(Continued)

*Primary Examiner* — Thomas Denion
*Assistant Examiner* — Steven D Shipe
(74) *Attorney, Agent, or Firm* — Hueschen and Sage

(57) ABSTRACT

A process (10) for co-producing synthesis gas and power includes in a synthesis gas generation stage, producing a hot synthesis gas and, in a nuclear power generation stage (12), heating a working fluid with heat generated by a nuclear reaction to produce a heated working fluid and generating power by expanding the heated working fluid using one or more turbines (16), with additional heating (14) of the heated working fluid by indirect transfer of heat from the hot synthesis gas to the heated working fluid.

9 Claims, 1 Drawing Sheet

U.S. PATENT DOCUMENTS

| | | | | | |
|---|---|---|---|---|---|
| 4,229,257 | A | * | 10/1980 | Forster | 376/391 |
| 4,257,846 | A | * | 3/1981 | Pierce | 376/391 |
| 4,413,348 | A | * | 11/1983 | Kapich | 376/367 |
| RE31,697 | E | * | 10/1984 | Gomberg et al. | 60/644.1 |
| 5,431,016 | A | * | 7/1995 | Simpkin | 60/650 |
| 5,727,379 | A | * | 3/1998 | Cohn | 60/39.182 |
| 5,813,215 | A | * | 9/1998 | Weisser | 60/39.181 |
| 6,918,254 | B2 | * | 7/2005 | Baker | 60/653 |
| 7,028,481 | B1 | * | 4/2006 | Morrow | 60/649 |
| 7,118,606 | B2 | * | 10/2006 | Labinov et al. | 48/127.9 |
| 7,436,922 | B2 | * | 10/2008 | Peter | 376/383 |
| 2004/0244377 | A1 | * | 12/2004 | Geijsel et al. | 60/653 |
| 2007/0280400 | A1 | * | 12/2007 | Keller | 376/317 |
| 2009/0170968 | A1 | * | 7/2009 | Nahas et al. | 518/704 |
| 2011/0131992 | A1 | * | 6/2011 | Greeff | 60/644.1 |
| 2011/0302921 | A1 | * | 12/2011 | Ferguson et al. | 60/641.8 |
| 2012/0067056 | A1 | * | 3/2012 | Palmer et al. | 60/774 |
| 2012/0067060 | A1 | * | 3/2012 | Greeff | 60/780 |

FOREIGN PATENT DOCUMENTS

| | | | |
|---|---|---|---|
| WO | WO 2006050726 A1 | * | 5/2006 |
| WO | 2007/024569 | | 3/2007 |
| WO | WO 2010020944 A2 | * | 2/2010 |

OTHER PUBLICATIONS

Written Opinion of the International Searching Aughority for PCT/IB2009/053640.

\* cited by examiner

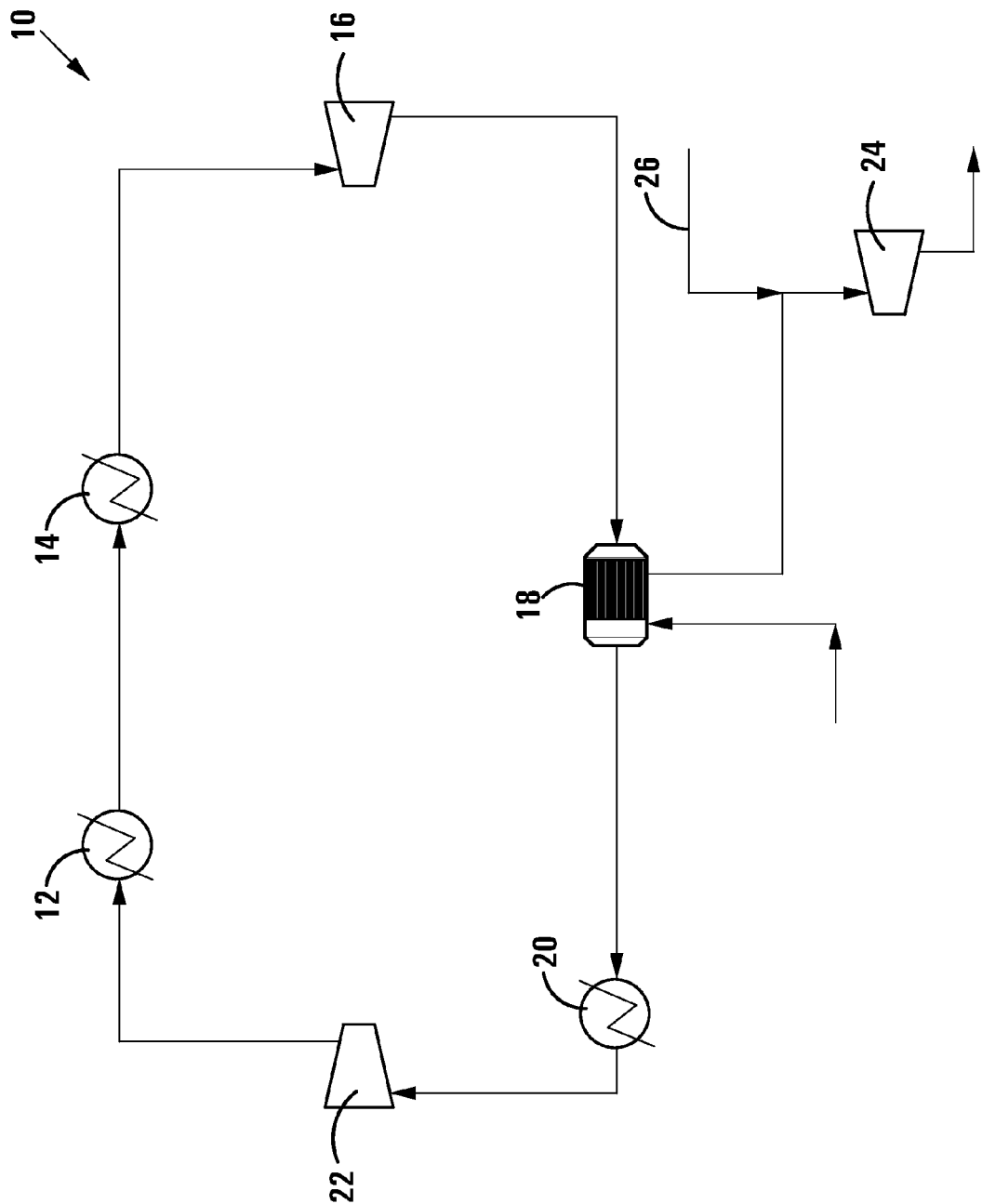

CO-PRODUCTION OF SYNTHESIS GAS AND POWER

THIS INVENTION relates to co-production of synthesis gas and power. In particular, the invention relates to a process for co-producing synthesis gas and power.

Synthesis gas, also known as syngas, is a mixture of at least carbon monoxide and hydrogen, typically produced by either gasification of a solid carbonaceous feedstock such as coal or by reforming of a gaseous carbonaceous feedstock such as natural gas. The synthesis gas generated may be used to produce a wide range of carbon-based chemicals, e.g. for synthesis of methanol or for Fischer-Tropsch synthesis of higher hydrocarbons.

Processes wherein synthesis gas is generated to produce carbon-based chemicals require heat and power for internal use. Large-scale facilities may require substantial amounts of heat and power and generation of such heat and power contribute to $CO_2$ emissions. One way to address the $CO_2$ emissions problem is to substitute conventional carbon based power and heat generation facilities with a non-carbon source such as nuclear technology.

Synthesis gas generation processes operate at elevated temperatures and, depending on the type of technology used to generate the synthesis gas, typically produce a hot synthesis gas at a temperature above 900° C. Heat is typically recovered from the hot synthesis gas using waste heat boilers producing steam. This steam is typically used to drive steam turbines for air separation units and to produce power. The Applicant has noted that heat recovery using waste heat boilers contribute considerably to second law thermodynamic losses in processes producing the synthesis gas due to large temperature difference driving forces used in such waste heat boilers. In other words, the use of waste heat boilers downgrades high quality or high temperature heat to a lower quality or lower temperature heat which is undesirable, as heat at a higher temperature can be used to produce more power compared to the same amount of heat at a lower temperature. Efficiency can thus be increased for synthesis gas generation processes by addressing the problem of high temperature difference driving forces in recovering heat from hot synthesis gas.

One way to reduce large temperature difference driving forces in waste heat boilers would be to raise the steam pressure or to superheat the steam. However, the fact that the critical temperature of water is 374° C. places an upper limit on the temperature at which saturated steam can be produced in waste heat boilers. Also, when using steam to generate power in e.g. a Rankine cycle, steam is typically not superheated to temperatures above 565° C. because of material of construction considerations.

Research and development on nuclear-assisted synthesis gas generation processes have thus far attempted to match the synthesis gas generation process operating temperature with the highest temperature heat that can be made available from a nuclear reactor loop. High temperature gas cooled nuclear reactors are able to provide heat at temperatures of about 800-900° C. However, at these comparatively low temperatures, the reasonable synthesis gas generation process options are limited, especially when a gasification process is employed.

As indicated hereinbefore, synthesis gas generation processes typically form part of large-scale facilities producing carbon-based chemicals. Such facilities typically include further processing steps operating at temperatures below 800° C. or even more typically below 500° C. Although these further processing steps may be promising candidates for heat integration with nuclear heat sources, the Applicant has found that these further processing steps are also promising candidates for heat integration with the hot synthesis gas produced in the synthesis gas generation process. The Applicant has also found that in such facilities at temperatures below about 250° C. there typically is a number of sources and sinks of heat, with the heat sources becoming numerous with decreasing temperature. There is thus typically an excess of available lower grade heat. Consequently there is little incentive to rather provide low grade heat from a nuclear source. In any event, the Applicant suspects that a more conventional light-water nuclear reactor would be the preferred choice for supplying low grade heat.

There is thus a perceived lack of opportunities for integrating a nuclear heat source with large-scale facilities producing carbon-based chemicals, and particularly so for integrating a nuclear heat source with a synthesis gas generation process. This has led to significantly different strategies for using nuclear energy, most notably nuclear driven hydrogen production through water splitting.

WO 2007/024569 discloses a process for the production of energy using integrated Brayton and Rankine thermal cycles that employ multiple fuels, including nuclear and coal, and multiple working fluids. Large temperature difference driving forces in a heat recover unit downstream of a gas expander are however not avoided. FR 2393052 discloses gasification of coal during which steam is produced from waste heat, with the steam being used in the gasification of the coal as well as for power generation.

A process which integrates a nuclear heat source with a synthesis gas generation process, despite the perceived lack of opportunities as set out hereinbefore, has now been invented. In addition, the process also addresses the problem of high temperature difference driving forces in recovering heat from hot synthesis gas.

According to the invention, there is provided a process for co-producing synthesis gas and power, the process including
  in a synthesis gas generation stage, producing a hot synthesis gas at a temperature of at least 650° C. and comprising at least CO and $H_2$, from a carbonaceous feedstock; and
  in a nuclear power generation stage, heating a working fluid with heat generated by a nuclear reaction to produce a heated working fluid and generating power by expanding the heated working fluid using one or more turbines, with additional heating of the heated working fluid by indirect transfer of heat from the hot synthesis gas to the heated working fluid.

In this specification, it is intended that the term "turbine" includes the concept of a turbine stage, so that when there is a reference to more than one turbine, it is to be understood that the turbines may be separate units, or a single unit comprising more than one clearly identifiable turbine stage, or a combination of separate units and one or more single units comprising more than one clearly identifiable turbine stage.

As used in this specification, indirect transfer of heat means that heat is transferred across a heat transfer surface from one fluid to another, so that the fluids are not in direct contact with each other and are therefore not mixed.

In one embodiment of the invention, the additional heating of the heated working fluid is performed prior to the expansion of the heated working fluid to generate power. In a different embodiment, the additional heating of the heated working fluid is performed in multiple steps by staging the additional heating and the expansion of the heated working fluid. In such an embodiment, the power generation stage may thus employ at least two turbines, with at least a portion of the heat from the hot synthesis gas being transferred to the heated working fluid after the heated working fluid has passed through one turbine but before the heated working fluid passes through another turbine, thereby to reheat the heated working fluid.

The nuclear power generation stage typically produces a heated working fluid at a temperature of at least 500° C., more typically at least 600° C., most typically at least 800° C.

The hot synthesis gas preferably is at a temperature above 900° C. The additional heating of the heated working fluid may heat the heated working fluid to a temperature above 600° C., more preferably above 750° C., even more preferably above 900° C.

Preferably, the nuclear power generation stage employs a Brayton power cycle in which the working fluid is gaseous and is not condensed during the cycle. Preferably the working fluid is not steam. The Brayton cycle may include recuperation and/or intercooling in order to increase the efficiency of power generation. When the power generation stage employs a recuperative Brayton power cycle, the process may include cooling the expanded working fluid in heat transfer relationship with re-compressed working fluid thus preheating the re-compressed working fluid, prior to recompressing the cooled expanded working fluid and prior to heat being transferred in indirect heat transfer fashion from the hot synthesis gas to the re-compressed working fluid preheated by heat exchange with the expanded working fluid.

The process may thus include in the power generation stage, expanding the heated working fluid through at least one gas expander turbine producing an expanded working fluid at a lower temperature and a lower pressure than the heated working fluid. The at least one gas expander turbine may then be employed to generate electrical power, e.g. using a generator. In such a case, more than one gas expander turbine may be employed in the power generation stage, with at least one gas expander turbine being employed to generate power, and at least one gas expander turbine being employed to drive a compressor to re-compress the expanded working fluid before the working fluid is reheated at least by heat exchange with the hot synthesis gas.

In a preferred embodiment of the invention, the nuclear reaction is performed in a high temperature gas cooled nuclear reactor in which a gaseous coolant is used as a coolant for the nuclear reactor. In such an embodiment the power generation stage typically employs a so-called direct Brayton power cycle in which the gaseous coolant is also the working fluid of the Brayton power cycle. Typically such a direct Brayton power cycle is a closed power cycle (i.e. a cycle in which the expanded working fluid is compressed and recycled in the cycle), and typically the working fluid is helium.

Alternatively, in embodiments in which the nuclear reaction is performed in a gas cooled nuclear reactor, the power generation stage may employ a so-called indirect Brayton power cycle. In an indirect cycle the gaseous coolant is re-circulated through the nuclear reactor in a primary loop which is closed, with heat transferred from the primary loop to the working fluid of the indirect Brayton power cycle contained in a secondary loop. Typically the gaseous coolant circulated in the primary loop is helium. The secondary loop may be an open loop cycle (i.e. a cycle in which the working fluid is used on a once-through basis with the expanded working fluid discharged from the system) or a closed loop cycle. In an open loop cycle the working fluid may, for example, be air and in a closed loop cycle mixtures of helium and nitrogen may, for example, be employed.

When the power generation stage includes a Brayton power cycle, be it a direct or indirect Brayton cycle, it is preferably configured as a combined cycle. In a combined cycle heat is transferred from the expanded Working fluid of the Brayton cycle (a so-called topping cycle) to the working fluid of a further power cycle (a so-called bottoming cycle). Typically the bottoming cycle is a Rankine cycle, typically using steam as working fluid. Combined cycle power systems are known to achieve increased efficiencies when compared to stand-alone Brayton cycles.

When the power generation stage employs a combined cycle, the Rankine cycle may also be modified to include the concepts of reheat and superheat to further increase efficiency.

Alternatively, or in addition, when a combined cycle is used, a portion of the steam generated may be directed towards process heating, rendering the system a combined heat and power system. Alternatively, process steam generated in a facility utilising the synthesis gas may be fed into the Rankine cycle to supplement power production.

Thus, the process may include in a hydrocarbon synthesis stage, producing hydrocarbons from the synthesis gas produced by the synthesis gas generation stage, and generating process steam in the hydrocarbon synthesis stage, process steam generated in the hydrocarbon synthesis stage being fed into the Rankine cycle to supplement power production. Examples of such hydrocarbon synthesis include methanol synthesis and Fischer-Tropsch synthesis The synthesis gas generation stage may be a gasification stage gasifying a solid carbonaceous feedstock, e.g. coal. Any conventional gasification technology may be employed provided a suitably hot synthesis gas is produced, typically at a temperature of at least about 900° C. Instead, the synthesis gas generation stage may be a reforming stage, reforming a gaseous hydrocarbonaceous feedstock, e.g. natural gas or associated gas. Any conventional reforming technology may be used, provided a suitably hot synthesis gas is produced, typically at a temperature of at least about 900°.

The process may include further cooling the synthesis gas after heat has been transferred from the hot synthesis gas to the heated working fluid. In this way, the synthesis gas can be cooled to a temperature suitable for further processing of the synthesis gas, e.g. in said hydrocarbon synthesis stage. Further cooling of the synthesis gas may include generating steam.

The invention will now be described, by way of example, with reference to the accompanying diagrammatic drawing which shows one embodiment of a process in accordance with the invention for co-producing synthesis gas and power, and with reference to the Example.

Referring to the drawing, reference numeral 10 generally indicates a process in accordance with the invention for co-producing synthesis gas and power. The process 10 comprises a hydrocarbon synthesis facility which includes a synthesis gas generation stage and a Fischer-Tropsch hydrocarbon synthesis stage (not shown) integrated with a nuclear power facility which includes a nuclear power generation stage. It is thus to be appreciated that the process 10 shown is very simplified, especially as far as the hydrocarbon synthesis facility is concerned. In fact, as far as the hydrocarbon synthesis facility and its synthesis gas generation stage are concerned, the only features shown in the drawing are the heat integration with the nuclear power facility and transfer of steam from the hydrocarbon synthesis facility.

The process 10 includes a nuclear power generation stage which includes a nuclear reactor 12 followed by a reheater 14, an expansion turbine 16, a boiler 18, a cooler 20 and a compressor 22.

The nuclear reactor 12 is preferably a high temperature gas cooled pebble bed nuclear reactor forming part of a Brayton cycle or recuperative Brayton cycle and the expansion turbine 16 shown typically is one of a number of turbines forming part of a turbine stage with at least one of the turbines driving the compressor 22 and one or more of the turbines driving generators to generate electricity.

The nuclear power facility shown thus employs a closed direct Brayton topping power cycle using helium as a working fluid. For illustrative purposes and for purposes of the Example that follows hereinafter, only one compression stage (the compressor 22) and only one expansion stage (the expansion turbine 16) are employed. In practice, as indicated hereinbefore, more stages will typically be used.

The process 10 also includes a bottoming power cycle which includes a steam turbine 24 which can be used to generate power for purposes of driving a compressor, generating electricity or the like. Steam from the hydrocarbon synthesis facility is added to supplement power production by the steam turbine 24, as shown by reference numeral 26.

In order to show the heat integration of a hydrocarbon synthesis facility with the nuclear power facility, the reheater 14 is shown. When the reheater 14 is omitted, i.e. when the duty of the reheater 14 is zero, then the drawing illustrates a stand-alone nuclear power facility. When the reheater 14 has a positive duty, transferring heat from the hydrocarbon synthesis facility to the nuclear power facility, the drawing illustrates the integration of a hydrocarbon synthesis facility or at least a synthesis gas generation stage with a nuclear power facility.

In order for the nuclear power facility to generate power, helium at a pressure of about 110 bar and a temperature of about 284° C. enters the nuclear reactor 12. In the nuclear reactor 12, the helium is heated to a temperature of about 900° C. (still at a pressure of about 110 bar) by means of the nuclear reactions taking place inside the nuclear reactor 12.

The hot helium is further heated in the reheater 14 to a temperature of about 1100° C. by heat exchange with hot synthesis gas exiting a synthesis gas generation stage (not shown) forming part of the hydrocarbon synthesis facility. The synthesis gas generation stage is typically a conventional syngas generation stage, producing hot synthesis gas comprising at least CO and $H_2$ from a carbonaceous feedstock such as coal. In a preferred embodiment of the invention, the hot synthesis gas has a temperature significantly higher than 900° C., e.g. about 1100° C. - 1150° C.

The reheated helium passes through the expansion turbine 16 where work is performed, with the helium exiting the expansion turbine 16 at a pressure of about 26 bar and a temperature of about 559° C. The helium passes through the boiler 18 further reducing the temperature of the helium to about 364° C. In the boiler 18, water at a pressure of 120 bar and a temperature of 324° C. is converted to saturated steam. The saturated steam is used to drive the steam turbine 24 with the pressure of the steam dropping to about 30 bar and the temperature of the steam dropping to about 234° C.

The helium exiting the boiler 18 is further cooled to a temperature of about 25° C. in the cooler 20 and then recompressed in the compressor 22 to a pressure of 110 bar and a temperature of about 284° C., before re-entering the nuclear reactor 12.

It is to be appreciated that the hydrocarbon synthesis facility will typically be complex, including stages for cleaning of the synthesis gas, hydrogen enrichment of the synthesis gas, $CO_2$ removal from the synthesis gas, hydrocarbon synthesis, etc. None of this is shown in the drawing. The drawing however importantly does illustrate the heat integration between the hydrocarbon synthesis facility and the nuclear power facility.

It is also to be appreciated that when the synthesis gas generation stage forms part of a Fischer-Tropsch hydrocarbon synthesis facility, any conventional Fischer-Tropsch hydrocarbon synthesis configuration may be used for the hydrocarbon synthesis stage. The Fischer-Tropsch hydrocarbon synthesis stage may thus include one or more suitable reactors such as fluidised bed reactors, a tubular fixed bed reactor, a slurry bed reactor or an ebullating bed reactor. It may even include multiple reactors operating under different conditions. The pressure in the reactors may be between 1 bar and 100 bar. The temperature may be between 160° C. and 380° C. Reactors will thus contain a Fischer-Tropsch catalyst, which will be in particulate form. The catalyst may contain, as its active catalyst component, Co, Fe, Ni, Ru, Re and/or Rh, but preferably Fe as its active catalyst component. The catalyst may be provided with one or more promoters selected from an alkaline metal, V, Cr, Pt, Pd, La, Re, Rh, Ru, Th, Mn, Cu, Mg, K, Na, Ca, Ba, Zn and Zr. The catalyst may be a supported catalyst, in which case the active catalyst component, e.g. Co, is supported on a suitable support such as a $Al_2O_3$, $TiO_2$, $SiO_2$, ZnO or a combination of these.

EXAMPLE

The process flow sheet shown in the drawing was used to simulate two cases as follows:

Case A: Combined cycle nuclear driven power plant next to a coal to liquids (CTL) facility employing high temperature gasifiers, i.e. no heat integration between the two facilities.

Case B: Combined cycle nuclear driven power plant heat integrated with a CTL facility employing high temperature gasifiers.

System boundaries were chosen to enable a simple comparison between case A and case B and included the following:

the nuclear power cycle and the waste heat boiler (in case B the waste heat boiler is the reheater 14) on the exit of the high temperature gasifiers in the CTL facility.

In both cases the total amount of power (work) generated was calculated.

The combined power cycle comprises a Brayton cycle (topping cycle) using helium coupled to a steam cycle (bottoming cycle comprising the boiler 18 and the steam turbine 24) and receiving heat from the high temperature gas cooled nuclear reactor 12. Heat is transferred from the helium cycle to a simple steam cycle. In case A heat is also transferred from the hot synthesis gas in waste heat boilers to a simple Rankine cycle. This is not shown in the drawing. Work required to pump the water in the Rankine cycle to pressure is neglected.

In case B the helium Brayton cycle receives additional heat input from the hot, raw synthesis gas from the high temperature coal gasifiers at a point between the nuclear reactor 12 and the expansion turbine 16 (in the reheater 14) to reheat the helium to a temperature of 1100° C. It was assumed that this could be achieved using hot synthesis gas, e.g. at about 1150° C.

Further assumptions for the two cases are listed below:

| Parameter | Value |
|---|---|
| Helium high P | 110 bar |
| Helium high T | 900° C. |
| Helium low P | 26 bar |
| Helium low T | 364° C. |
| Isentropic efficiency for turbines and compressors | 90% |
| Steam high P (saturated) | 120 bar |
| Steam high T | 324° C. |
| Steam low P | 30 bar |
| Helium compressor inlet T | 25° C. |

For steam generated directly from syngas heat for Case A, a simple steam cycle operating with saturated steam at 120 bar and an efficiency of 18% was used to calculate the power that can be generated with this steam. Steam power cycle efficiency may be increased using superheat, but for simplicity this was not included in the simulation. Brayton power cycle efficiency may also be increased further using reheat, compressor stage inter-cooling and recuperation; these improvements were also not considered.

Results of the simulations of case A and case B are summarised below. Heat and work numbers are shown separately for the two working fluids, helium and steam.

| Heat (Q) and work (W) streams in MW | | |
|---|---|---|
| | Case A | Case B |
| Helium | | |
| $Q_{in}$ nuclear (reactor 12) | 512 | 512 |
| $Q_{in}$ syngas (reheater 14) | 0 | 166 |
| W compressor 22 | 219 | 219 |
| W turbine 16 | 389 | 454 |
| W nett helium | 170 | 235 |
| Steam | | |
| $Q_{in}$ helium (boiler 18) | 62 | 162 |
| $Q_{in}$ syngas (waste heat boiler for syngas not shown) | 166 | 0 |
| W steam turbine 24 - helium heat | 11 | 29 |
| W turbine driven by syngas heat - not shown | 30 | 0 |
| W total steam | 42 | 29 |
| Q total in helium and steam | 678 | 678 |
| W nett helium and steam | 211 | 264 |

The results show that in Case B 25% more power (work) is produced compared to Case A. This represents an increase in rational efficiency of power production from 31% to 39%. This efficiency is defined as the total work produced by the helium and steam working fluids divided by the total heat input to the cycles (heat from nuclear source+heat from synthesis gas).

The simulation illustrates the benefit that one can expect from using the high level heat contained in raw synthesis gas leaving high temperature gasifiers in a CTL facility more efficiently. This is done by directing this heat into a nuclear driven combined cycle power generation scheme thereby avoiding to a large extent the high temperature driving forces used to merely generate steam from this high temperature heat in waste heat boilers. Advantageously, the process 10, as illustrated, thus employs a relatively small temperature difference driving force for recovery of heat from the hot synthesis gas produced in synthesis gas generation. The hydrocarbon synthesis facility will have a higher overall efficiency than a conventional similarly sized hydrocarbon synthesis facility, when the invention is employed. The Example shows that a 25% increase in power production may be obtained. This represents a considerable increase in efficiency of power generation. Although the Example is of a theoretical nature and many assumptions were made, it is expected that the same benefit may be obtained in practice, even in the case of using an intermediate heat transfer medium between the nuclear reactor 12 and the working fluid for power generation.

Nuclear technology is expensive. By employing the invention as illustrated in the drawing, it is possible to produce more power using the same amount of heat, compared to the conventional approach of using the high temperature heat available from the hot synthesis gas stream directly to raise steam. This translates into reduced capital costs since less nuclear plant capacity would be required.

The invention claimed is:

1. A process for co-producing synthesis gas and power, the process including
in a synthesis gas generation stage, producing a hot synthesis gas at a temperature of at least 650° C. and comprising at least CO and $H_2$ from a carbonaceous feedstock; and
in a nuclear power generation stage employing a Brayton power cycle in which the working fluid is gaseous and is not condensed during the cycle, heating said working fluid with heat generated by a nuclear reaction to produce a heated working fluid and generating power by expanding the heated working fluid using one or more turbines, with additional heating of the heated working fluid to a temperature above 600° C. by indirect transfer of heat from the hot synthesis gas to the heated working fluid.

2. The process as claimed in claim 1, in which the additional heating of the heated working fluid is performed prior to the expansion of the heated working fluid to generate power.

3. The process as claimed in claim 1, in which the additional heating of the heated working fluid is performed in multiple steps by staging the additional heating and the expansion of the heated working fluid.

4. The process as claimed in claim 1, in which the hot synthesis gas is at a temperature above 900° C.

5. The process as claimed in claim 4, in which the additional heating of the heated working fluid heats the heated working fluid to a temperature above 900° C.

6. The process as claimed in claim 1, in which the Brayton power cycle is configured as a combined cycle, in which heat is transferred from the expanded working fluid of the Brayton power cycle to a working fluid of a further power cycle.

7. The process as claimed in claim 6, in which the further power cycle is a Rankine cycle using steam as working fluid.

8. The process as claimed in claim 7, which includes in a hydrocarbon synthesis stage, producing hydrocarbons from the synthesis gas produced by the synthesis gas generation stage, and generating process steam in the hydrocarbon synthesis stage, process steam generated in the hydrocarbon synthesis stage being fed into the Rankine cycle to supplement power production.

9. The process as claimed in claim 1, in which the nuclear reaction is performed in a high temperature gas cooled nuclear reactor in which a gaseous coolant is used as a coolant for the nuclear reactor.

* * * * *